United States Patent

[11] 3,547,237

[72] Inventor Kenneth H. Ives
   401 E. 32nd St., Chicago, Ill. 60616
[21] Appl. No. 736,822
[22] Filed June 13, 1968
[45] Patented Dec. 15, 1970

[54] REMOTELY CONTROLLED POWER PICKUP FOR TRACKLESS ELECTRIC VEHICLES
3 Claims, 4 Drawing Figs.
[52] U.S. Cl. .................................................. 191/4,
   191/45, 191/57, 191/66
[51] Int. Cl. ...................................................... B60l 5/16,
   B60l 5/34, B60l 13/00
[50] Field of Search ............................................ 191/52, 57,
   .94; 19.1/45, 50, 96X, 95, 85

[56] References Cited
UNITED STATES PATENTS
932,707 8/1909 Hunt ............................ 191/4
2,117,030 5/1938 Larsson ........................ 191/85

Primary Examiner—Arthur L. La Point
Assistant Examiner—George H. Libman
Attorney—Merriam, Marshall, Shapiro & Klose ABSTRACT: A remotely controlled power pickup device for trackless electric vehicles operating from overhead power lines, the device enabling the vehicles to selectively pass each other, detour, operate on short routes without overhead power lines, and operate from and between different routes having overhead power lines, all without requiring the driver to leave his seat in the vehicle. Control apparatus actuated by the driver in the vehicle is provided for selectively raising or lowering the power contacts of the trolley vehicle. A battery power source is maintained within the vehicle for temporary use to power the vehicle when not operated from the overhead power lines.

PATENTED DEC 15 1970 3,547,237
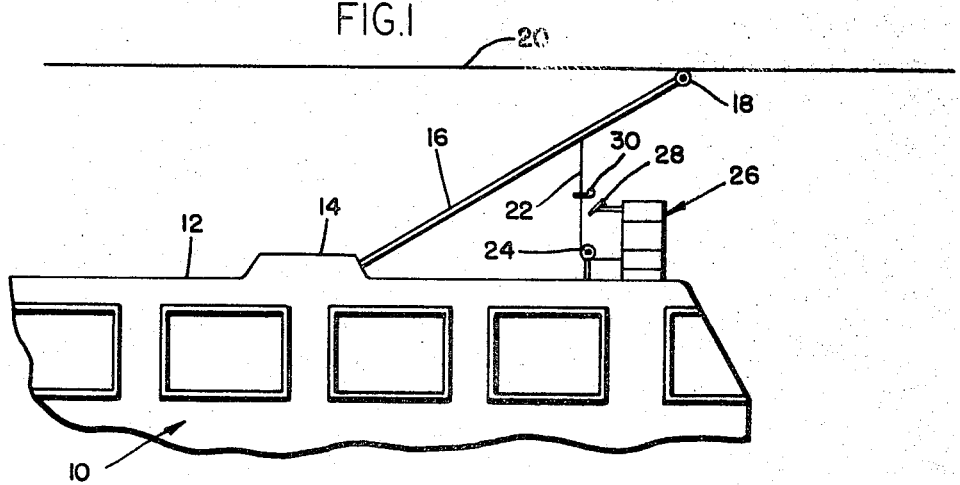
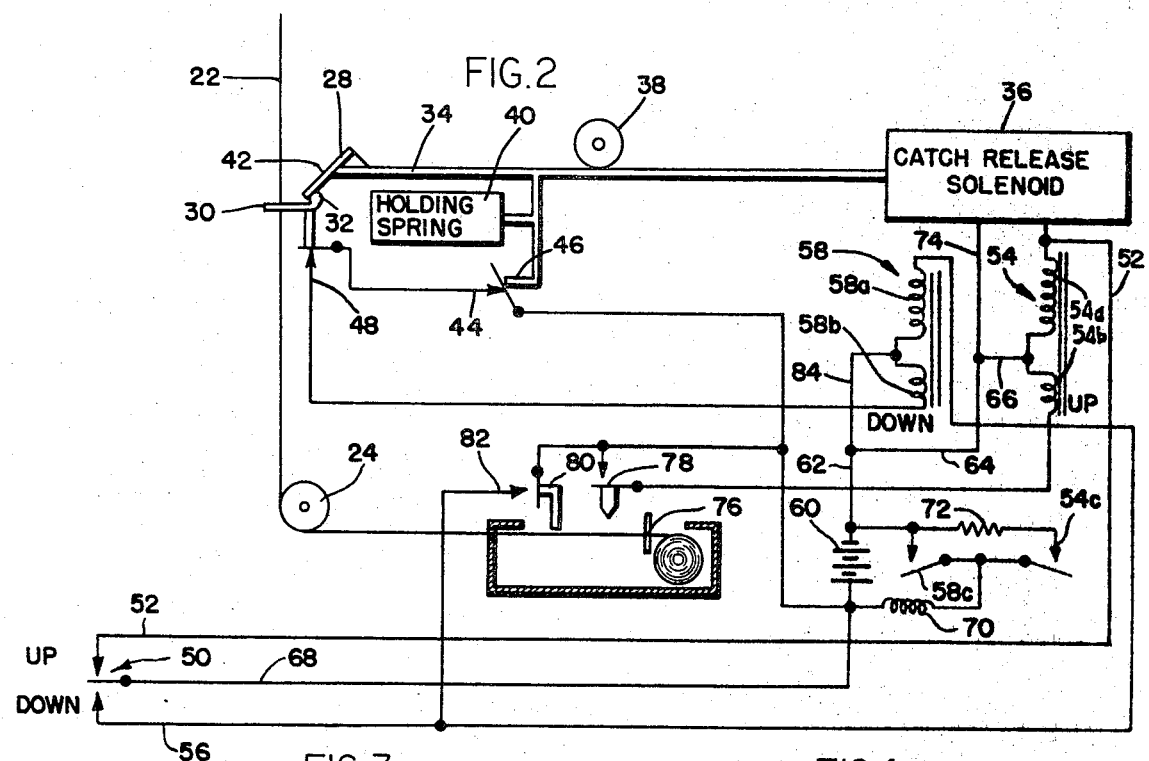
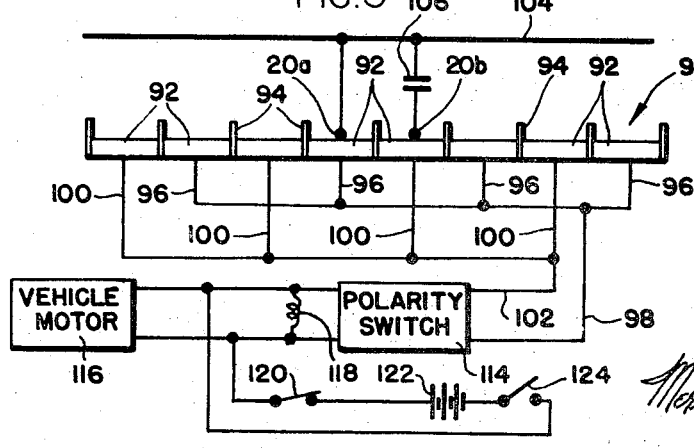
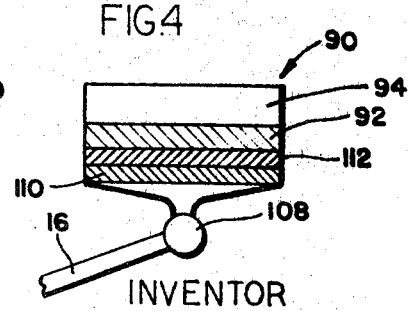
INVENTOR
KENNETH H. IVES
Merriam, Marshall, Shapiro & Klose
ATTYS.

REMOTELY CONTROLLED POWER PICKUP FOR TRACKLESS ELECTRIC VEHICLES

This invention relates to trackless electric vehicles, and in particular to such vehicles wherein the primary source of power is obtained from overhead power lines.

Present trolley devices for trackless vehicles with overhead power wires are usually manually operated from outside the vehicle. Presently known remotely controlled trolley devices for trackless electric vehicles whose primary source of power is obtained from overhead power wires require special guides attached to the overhead wires or structures, to guide the trolley sliders or wheels onto the wires. This greatly limits the places at which the return to overhead power can be made, hence presently known systems cannot readily be used for passing another similar vehicle, where operating conditions make this desirable, nor for unexpected detours, such as when traffic tieups occur from fire, accident or other unusual conditions.

A common type of "trackless vehicle" is a trolley bus. Although the invention herein will be described in connection with a trolley bus, it is to be understood that this is merely for illustrative purposes and that the principles of the present invention can as well apply to any other type of "trackless vehicle."

The source of power for the trolley motor is usually derived from overhead direct current power lines, which are contracted by slides or trolley wheels carried by a pivoting trolley pole or poles above the vehicle and connected to the trolley motor through appropriate controllers. While such trolley buses are not confined to any track, they must however follow a particular route over which the overhead power lines have been provided. Thus, it has not been possible for such trolley buses to make detours around road construction or obstructions, or operate over other extensions or routes beyond or away from existing overhead wires. Detours require moving the overhead wires. This changeover procedure is time consuming, expensive, and often results in substantial service delays.

Another problem in utilizing the trolley buses has been the inability for one bus to pass the other, such as when the bus routing sequence is desired to be changed or when one of the vehicles is disabled. While devices have been designed for enabling trolley buses to pass each other, these require that both such vehicles be equipped with the device. Otherwise, passing requires one operator to leave the vehicle, so that he may maneuver the trolley pole to break contact with the overhead lines until the other vehicle has passed.

In accordance with the principles of the present invention, there is provided apparatus for enabling trackless electric vehicles to selectively operate from and between different routes having overhead power lines, without requiring the driver to leave the vehicle nor requiring the use of overhead wires having special guides. The present invention utilizes apparatus for selectively switching the power contacts in the trolley vehicle wires between the overhead power lines and a battery power source maintained within the vehicle for temporary use. Control means operable from the driver's seat are utilized for raising and lowering the power contacts during the switching operation. The trolley bus wires are coupled to a novel multiple contact bar which when raised for connection to the overhead power lines assures that the two overhead lines are contacted by different contact portions, each connected to one of the trolley vehicle lead-in wires, with the contact bar designed so as to maintain firm contact with the overhead line as the vehicle moves along and across the road as in normal use.

The invention will be better understood from the following detailed description thereof taken in conjunction with the accompanying drawings in which:

FIG. 1 is a fragmentary schematic view illustrating a trolley bus incorporating the remotely controlled power pickup constructed in accordance with the principles of the present invention;

FIG. 2 is a schematic illustration of the control circuit for controlling the raising and lowering of the trolley vehicle wires;

FIG. 3 is a schematic illustration of the construction of a novel multiple contact bar incorporated in the present invention; and FIG. 4 is a sectional view of a multiple contact bar constructed according to the principles of the invention.

With reference to the drawings, the present invention will be specifically described in terms of a trolley bus, although it is to be understood that this is not intended to be a limitation of the invention, since the principles herein can be applied to any type of electrical trackless vehicle.

Referring to FIG. 1 there is shown a fragmentary view of a trolley bus 10 having a roof 12 upon which is located a trolley spring housing 14. The springs within the housing 14 are attached to one end of a pivoting trolley pole or poles 16 carrying a contact bar 18 for electrically contacting the overhead power lines 20. The overhead power lines 20 are of the standard type of two-wire high voltage, direct current lines used for supplying the main power to the trolley bus motor.

In accordance with the invention, a rope, cord or wire 22 has one end attached by suitable means to the trolley pole 16, the cord 22 being wound through a windlass 24 for hauling in the cord 22 during lowering of the trolley pole 16. A control unit 26 is mounted atop the roof 12 for controlling the raising and lowering of the trolley pole 16 under signaling from the trolley bus driver. The control unit 26 includes a catch 28 which locks on a stop 30 connected to the cord 22 when the trolley pole 16 is in the lowered position on the top of the vehicle 10. Means are also provided within the control unit 26 for releasing the stop 30 upon a signal from the trolley bus driver so that the trolley pole 16 can be raised to the position shown in FIG. 1 with the contacts 18 engaging the overhead power line 20. To avoid complicating the drawings, the usual means for bringing the vehicle power lines from the trolley bus motor and supporting the same along the trolley pole 16 to the contact 18 have not been shown.

FIG. 2 illustrates the detailed construction of the catch and release mechanism and the control circuit for controlling the raising and lowering of the trolley pole 16 in accordance with the trolley bus driver's selectively operating the trolley bus from the overhead power lines 20 or from a suitable battery power source carried within the trolley bus. As shown in FIG. 2, the catch 28 is sloped downwardly toward the cord 22, and is provided with an overhang so that the stop 30 will push the catch aside as the stop is lowered past the catch. Also, it must be noted that the catch 28 will securely hold the stop 30 in position in spite of bouncing of the trolley bus, such securing action being aided by a protuberance or roller 32 on the stop 30. The catch 28 is mounted at one end of a solenoid actuated arm 34, the other end of the arm 34 being engaged within a catch release solenoid 36 which controls the movement of the catch 28. A retainer bar or roller 38 is firmly anchored to the roof of the vehicle and is mounted atop the catch actuating arm 34 in order to hold the catch 28 in place against the pull of the trolley springs when the trolley pole 16 is in the lowered position as shown in FIG. 2. Suitably attached to the catch actuating arm 34 is a holding spring 40 which keeps the catch 28 in position over the stop 30 until the catch is pulled aside by actuation of the catch release solenoid 36, or is pushed aside by the descending stop 30 operating on the downwardly sloping portion 42 of the catch 28.

As can be seen from FIG. 2 the illustration is in schematic form to more readily illustrate the inventive features, since the actual mechanical configuration of the various components and the mounting thereof can readily be provided by those skilled in the art, and such mechanical mounting configurations do not form any part of the present invention.

Attached to the catch mechanism in a contact 44 which is closed by an actuating end 46 when the catch 28 is in place. Another contact 48, in series with contact 44, is located below the stop 30 so that the contact 48 is closed when the stop 30 has been pulled below the catch 28 in the lowered position of the trolley pole 16.

A two-way spring switch 50 is located at or near the trolley bus driver's seat so as to be readily operable by the driver. The switch 50 supplies an impulse to the up or down wires when the switch is closed in the respective directions. The up lead 52 is connected to an up relay 54; similarly, the down lead 56 is connected to a down relay 58. The relays 54 and 58 include respective main windings 54a and 58a; and respective release windings 54b and 58b, such that both relays close and lock when their main a winding is temporarily energized, and release when an opposite current passes through the release winding b. A common relay for performing this function is one having a permanent magnet armature to lock the relay when temporarily energized and to release upon actuation of a reverse current through the release windings. Operation of relays 54 and 58 closes contacts 54c and 58c respectively associated with these relays.

When the trolley bus driver momentarily actuates switch 50 to contact the up lead 52, up relay 54 operates by current from control circuit battery 60 passing through lead 62, lead 64, lead 66, relay winding 54a, lead 52, through the temporarily actuated spring switch 50, and via lead 68 to the other side of battery 60. As mentioned, this temporary actuation of up relay 54 locks the relay so that release of switch 50 by the operator does not release the relay 54. Operation of up relay 54 closes the associated relay contact 54c to complete an operating path for the windlass motor, the windings of which are indicated as motor windings 70 in FIG. 2. Actuation of the windlass motor 70 is provided by a current from control battery 60 flowing through windlass motor windings 70, through up relay contact 54c, resistance 72, and back to the other side of battery 60. The resistance 72 should be of such a value that the power of the windlass motor is reduced to acting as a retarder to the upward swing of the trolley pole 16 being raised by the action of the trolley springs in housing 14. It is to be understood that windlass motor windings 70 are associated with the schematically illustrated windlass 24. Operation by the bus driver of the switch 50 permits actuation of the catch release solenoid 36 by connection to the control circuit battery 60 through lead 62, 64 and 74, and to the other side of the battery through leads 52, the switch 50, and lead 68. Actuation of the catch release solenoid 36 momentarily pulls back the actuating arm 34 so as to release the stop 30 held down by the catch 28. Thus, the trolley pole 16 begins to pivot and rise upwardly toward the overhead power lines under the pulling action of the trolley springs as retarded by the windlass motor 70.

When the cord 22 is out to operating length, so that the power contacts 18 are engaging the overhead power lines 20, a protuberance 76 closes contact 78, allowing release current to flow from control circuit battery 60 through the release windings 54b of up relay 54. This releases the up relay 54, thereby opening relay contact 54c, and removing power from the windlass motor windings 70. In the event the trolley pole 16 has pivoted well beyond the operating position, protuberance 76 engages a contact arm 80, thereby closing contact 82 causing down relay 58 to operate so as to lower the pole 16.

When the trolley pole 16 is in the raised position shown in FIG. 1, the trolley bus motor is operated by power derived from the overhead power lines 20. When the trolley bus driver must detour from the standard route having the overhead power lines, or when he desires to pass another trolley bus, the trolley pole 16 is lowered and the trolley bus motor is coupled to a battery power source carried by the vehicle for operating the vehicle.

In this connection, the bus driver momentarily operates switch 50 to the down position which sends a current from control circuit battery 60 through lead 62, lead 84, through down relay winding 58a, and via lead 56 through the switch 50 and lead 68 to the other side of the battery 60. Actuation of down relay 58 closes down relay contact 58c to send current from control circuit battery 60 at full strength through the windlass motor windings 70, enabling the windlass motor to haul in the cord 22 and thereby lower the trolley pole 16 against the pull of the trolley springs. As the trolley pole 16 is lowered to the down position, the stop 30 engages the downwardly depending portion 42 of catch 28 to push the catch aside and thereafter close contact 48. As the stop roller 32 passes underneath the catch 28, the catch 28 is returned to its outward locking position adjacent the cord 22 by means of the holding spring 40. This closes the contact 44, enabling current to flow from the control circuit battery 60 through the down relay release winding 54b, thereby releasing the relay contact 58c and shutting off the windlass motor. The final position is shown in FIG. 2, with the trolley pole 16 lowered atop the roof 12 of the trolley bus and maintained in position by the stop 30 below the catch 28.

Alternative arrangements to the control circuit shown in FIG. 2 can of course be provided in accordance with the teachings herein. As an example, an alternate to contact 44 would be to provide a contact operated by the protuberance 76. Also, as an alternate to the resistance 72, contact 54c, and the use of windlass motor 70 as an electrical retarder on raising the trolley pole 16, a governor can be provided on the windlass to slow the release of the trolley rope to the desired play-out speed.

Essential to the operation of the present invention, is a contact bar 18 which can easily engage the proper overhead power lines 20 without the driver having to leave the vehicle, and without special guides on the overhead wires. Such a contact is shown in FIGS. 3 and 4, wherein there is illustrated a multiple contact device 90 with the schematic illustration being shown in FIG. 3, and a sectional view of one embodiment of the invention shown in FIG. 4. In the schematic view of FIG. 3, the multiple contact device 90 includes a series of conducting contact sections 92 which are separated by insulating ridges 94. The insulating ridges 94 project a slight amount above the top surface of the conducting contact section 92 so as to prevent the contact bar 90 from disengaging the overhead power lines 20 when the vehicle is on a bumpy road. The separation between centers of successive insulating ridges 94 must be equal to or an odd fraction (1/3, 1/5, 1/7, 1/9) of the distance between the two overhead power lines 20. This will insure that one of the power lines will engage a first contact section 92 and the other power line will engage the next succeeding conducting section or a subsequent one not connected to the same lead-in wire.

As is shown schematically in FIG. 3, leads 96 interconnect alternate conducting contact sections 92 to form a set of common conducting sections which are connected to vehicle power wire 98. Similarly, leads 100 are connected to the remaining alternate conducting sections 92 to form another set of common conduction sections which are connected to vehicle power wire 102.

It must be particularly noted that the multiple contact bar 90 is positioned transversely at approximately 90° to the overhead power lines 20. This is most easily accomplished by use of two trolley poles, and connecting them to the multiple contact bar 90 with the same separation they have on the roof of the vehicle, so they always form a parallelogram, keeping the multiple contact bar 90 in the indicated position. This coupling of the two trolley poles means that only one raising and lowering mechanism is needed per vehicle, rather than one per pole. As shown in FIG. 3, in a normal arrangement for such overhead power lines, one of the lines 20 may comprise a ground wire 20a supported by a support wire 102, and the other line 20b is insulated by insulating means 106 and similarly supported from the support wire 104. Thus, the view as shown in FIG. 3 is a view looking directly at the front or back of the vehicle with the contact bar 90 mounted to the trolley pole 16 atop the vehicle and transversely to the power lines 20.

An illustration of the manner in which the contact bar 90 can be mounted to the vehicle is shown in FIG. 4, wherein such attachment can be provided by a pair of swivel joints 108 attached to each end of the trolley pole 16. In FIG. 4 one of the swivel joints 108 is shown attached to a frame 110 which supports the contact bar 90. In the embodiment shown in FIG. 4, the insulating ridges 94 can be formed as a part of a longitudinal base insulator 112 such that the ridges 94 divide the longitudinal frame into separate compartments into which is mounted the conducting contact sections 92.

Referring to FIG. 3, a polarity switch 114 is provided between the vehicle power wires 98, 102 and the trolley bus motor 116 so that the same polarity of current is supplied to the motor no matter which of the contact sections 92 of the contact 90 are engaged with the overhead power lines 20, and the same polarity as when the motor is powered from the battery source 122. A relay 118 is provided across the incoming vehicle power wires to operate an associated relay contact 120 for switching the vehicle motor 116 between operation from the overhead power lines 20 and from the battery power source 122. A main battery switch 124 is provided to disengage the battery 122 circuit when the vehicle is not being operated. Suitable means can of course be provided for charging the battery 122 when the trolley vehicle is operating on the overhead power lines 20.

Alternative embodiments of this invention can readily be provided by those skilled in the art in accordance with the teachings of the invention herein, such embodiments being within the scope of this invention. As an example, an alternate alignment can be provided in which the trolley pole is hingedly mounted at one side of and across the vehicle, so that raising of the multiple contact bar contacts power wires which may be supported one above the other at the curb side of the vehicle. Such an arrangement would be preferred where power lines over the street are not permitted, or for uses where frequent recharging of a battery operated vehicle, as a delivery truck, is desired.

Thus, the foregoing detailed description has been given for clearness of understanding only, and no unnecessary limitations should be understood therefrom, as modifications will be obvious to those skilled in the art.

I claim:

1. In a trackless electric vehicle operating from overhead power lines, including an electric motor for driving said vehicle, vehicle power wires coupled to said motor and detachably engaging said power lines for operating said motor, and a movable pole carrying said vehicle power wires, said pole having one end pivotally mounted to said vehicle for connecting said vehicle power wires with said overhead power lines, the improvement of means for selectively operating said vehicle away from said overhead power lines, said improvement comprising:
   a battery power source mounted in said vehicle and connected to said motor for operating said motor independently of the overhead power lines;
   a multiple contact device mounted to the pivoting free end of said pole for contacting the overhead power lines;
   a plurality of insulatably separated conducting contact sections longitudinally aligned in said multiple contact device and transversely disposed to the overhead power lines;
   means for connecting each of said vehicle power wires to alternate conducting contact sections;
   polarity switching means interconnecting the vehicle power wires and said motor and battery power source for energizing said motor in the same direction when the vehicle is being operated from the battery power source, or operated from said vehicle power wires connected through alternate conducting contact sections to the overhead power lines;
   power operated means for pivoting said pole between a raised position adjacent said overhead power lines and a lowered position adjacent to the top of the vehicle to detachably engage the vehicle power wires with the overhead power lines;
   control means selectively operable by the driver of the vehicle to actuate said power operated means for selectively connecting said motor to said overhead power lines and to said battery power source; and
   wherein said multiple contact device includes a plurality of insulating ridges, each mounted between said conducting contact sections for maintaining contact between each of the overhead power lines and said respective contact sections.

2. The improvement of claim 1, wherein the separation between successive insulating ridges is equal to or an odd fraction of the separation between said overhead power lines.

3. In a trackless electric vehicle operating principally from overhead power lines but temporarily from a battery power source mounted in said vehicle and connected to said motor for operating said motor independently of the overhead power lines, including an electric motor for driving said vehicle, vehicle power wires coupled to said motor and detachably engaging said power lines for operating said motor, and a movable pole carrying said vehicle power wires, said pole having one end pivotally mounted to said vehicle for connecting said vehicle power wires with said overhead power lines, the improvement of means for selectively operating said vehicle away from said overhead power lines, said improvement comprising:
   a multiple contact device mounted to the pivoting free end of said pole for contacting the overhead power lines;
   a plurality of insulatably separated conducting contact sections longitudinally aligned in said multiple contact device and transversely disposed to the overhead power lines;
   means for connecting each of said vehicle power wires to respective conducting contact sections;
   power operated means for pivoting said pole between a raised position adjacent said overhead power lines and a lowered position adjacent to the top of the vehicle to detachably engage the vehicle power wires with the overhead power lines;
   control means selectively operable by the driver of the vehicle to actuate said power operated means for selectively connecting said motor to said overhead power lines and to said battery power source; and
   said multiple contact device including a plurality of insulating ridges, each mounted between said conducting contact sections for maintaining contact between each of the overhead power lines and said respective contact sections.